United States Patent Office 2,850,934
Patented Sept. 9, 1958

2,850,934

TWO HEADED BOLT HAVING PREDETERMINED SHEAR STRENGTH

William E. Sehn, Highland Park, Mich., assignor to General Motors Corporation, Detroit, Mich., a corporation of Delaware Application June 15, 1954, Serial No. 436,837

1 Claim. (Cl. 85—1)

This invention relates to fastening means, and more particularly to a threaded fastening means adapted to be adjusted from either end thereof.

It is frequently desirable and sometimes necessary, where threaded fastening devices such as a bolt are employed to secure a part to a support, to be able to adjust the bolt from the leading end of the threaded portion thereof. This problem has been encountered in the past, since there is disclosed in the art a variety of bolts having various slots in the threaded end thereof for reception of a tool such as a screw driver. There are also disclosed in the art a variety of bolts having integral square portions of lesser diameter projecting beyond the threaded end thereof for locking a nut thereon, which portions could be used as a head by which the bolt could be adjusted.

The above devices, however, are unsatisfactory in the case of the adjustment from the threaded end of a bolt securing a part to a support where the torque applied thereto in adjusting the same is relatively high. In such cases, the screw driver or other tool may be bent or twisted, the slot in the end of the bolt may be deformed or the threads of the bolt may be deformed. In the case of the square projection extending from the end of the bolt, the same may be sheared from the end of the bolt under the torque necessary to adjust the bolt.

It is now proposed to provide a threaded fastener or bolt which, due to the particular novel structure thereof, may be adjusted from the leading end of the threaded portion thereof without the danger of the tool engaging portion shearing from the remainder of the bolt.

Figure 1:
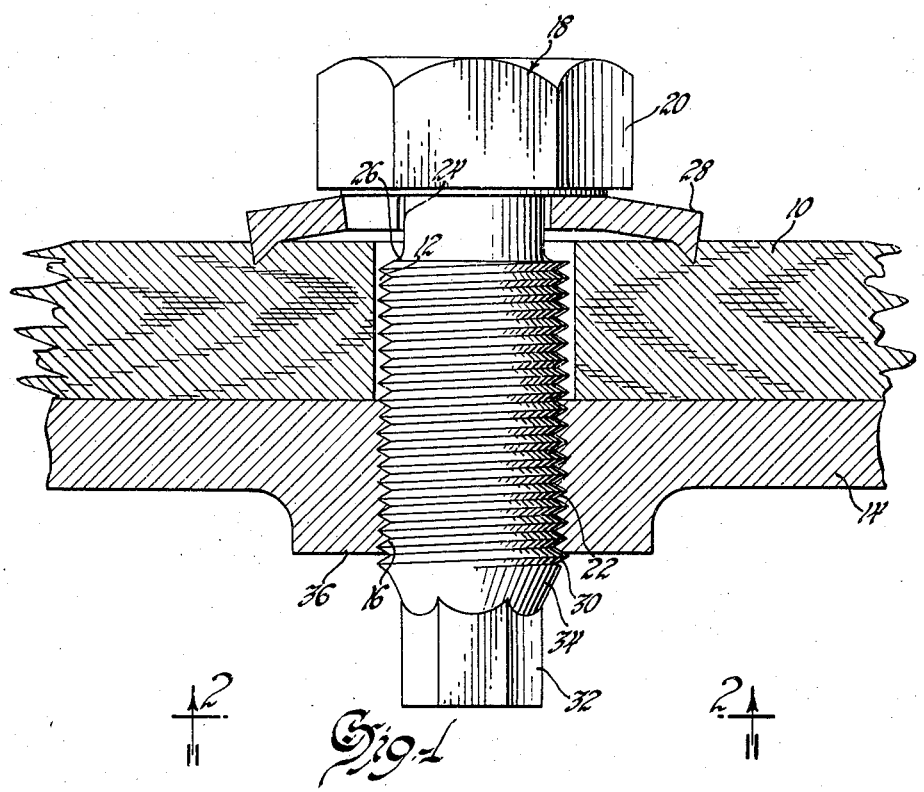
Figure 1 is an elevational view, partly in cross-section, of a fastener assembly embodying the invention.
Figure 2:
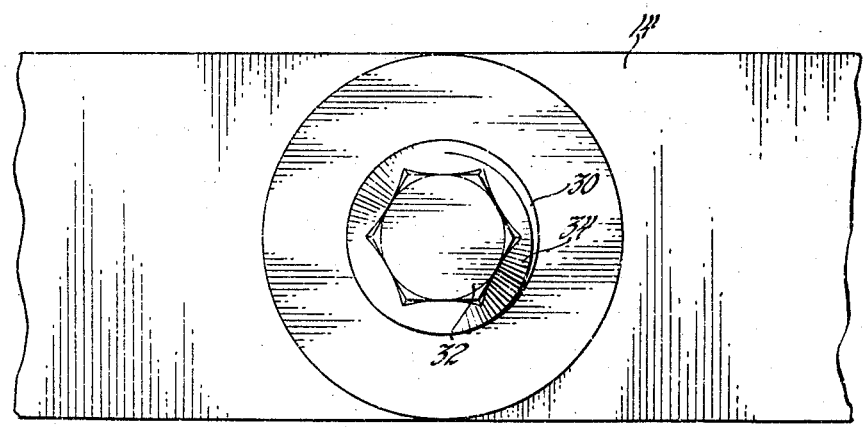
Figure 2 is a plan view of the assembly shown by Figure 1 taken in plane of line 2—2 and looking in the direction of the arrows.

Referring to the drawings in greater detail, a fastener assembly embodying the invention comprises a part 10 having a passage or aperture 12 secured to a support 14 having a threaded aperture 16 by means of the bolt 18. The bolt 18 has a usual head 20 at one end thereof and a usual threaded portion 22 adapted to engage the internal threads of the aperture 16 in the support 14. A recess 24 may be provided between the head 20 and the adjacent end 26 of the threaded portion 22 to receive the lock washer 28. The leading end 30 of the threaded portion 22 is provided with a second polygonal head 32 having a diameter less than the root diameter of the threaded portion 22. The second polygonal head 32 is integrally joined to the leading end 30 of the threaded portion 32 by means of the conical section 34 having a maximum diameter equal to or less than the pitch diameter of the threaded section 22.

It will be noted that when the bolt 18 is turned under considerable torque by the first head 20 that the second head 32 extends beyond the rear face 36 of the support member 14. Thus, a tool such as a wrench may be applied to the second head 32 to further tighten or loosen the bolt 18. Since the second head 32 is of polygonal cross-section, this head itself approaches a maximum section that will pass through the internally threaded aperture 16 in the support 14. Further, since the second head 32 is integrally connected to the leading end 30 of the threaded section 22 by means of conical section 34 having a maximum diameter equal to or slightly less than the pitch diameter of the threaded section 22 the conical section 34 also approaches the maximum section that will pass unrestricted through the internally threaded aperture 16. By this structure maximum shear strength is imparted to the junction between the second head 32 and the leading end 30 of the threaded section 22. In addition, the second head 32 and the conical section 34 may be sufficiently hardened by the usual metallurgical processes to further insure that the bolt 18, on adjustment at the head 32, will shear at a root diameter of the threaded section 22 rather than at the junction between second head 32 and the leading end 30 of the threaded section 22.

From the above specification and drawings it is apparent that there has been provided a bolt having a novel construction at the leading end thereof so that the bolt may be adjusted from either end thereof without the danger of the tool engaging portions of the bolt shearing therefrom and leaving the threaded section of the bolt in the threaded aperture.

What is claimed is:

A threaded fastener for securing together a plurality of members at least one of which is correspondingly threaded, the combination comprising a first head on said fastener adapted to engage the other of said members, an integral shank extending from said first head and insertable through said members, said shank having a threaded portion provided at its leading end, a second head formed on said fastener integral therewith adjacent said leading end, means on said second head for receiving a torque applying tool whereby said fastener may be tightened, said second head having a maximum diameter less than the root diameter of said threaded portion and spaced therefrom by a connecting conically flared section having a base circle substantially equal to the root diameter of said threaded portion, said threaded portion having a predetermined shear strength and said second head through which torque is applied and said conically flared section having a shear strength greater than the predetermined shear strength of said threaded portion whereby torque overload shears said fastener only in said threaded portion.

References Cited in the file of this patent

UNITED STATES PATENTS

| | | |
|---|---|---|
| 1,093,434 | Kent | Apr. 14, 1914 |
| 1,661,042 | Isaacson | Feb. 28, 1928 |
| 1,923,647 | Vera | Aug. 22, 1933 |
| 1,926,925 | Wescott | Sept. 12, 1933 |
| 2,005,672 | Chaffee | June 18, 1935 |
| 2,192,322 | Mitchell | Mar. 5, 1940 |
| 2,485,280 | Grace | Oct. 18, 1949 |
| 2,638,368 | Weinberg | May 12, 1953 |
| 2,672,069 | Mitchell | Mar. 16, 1954 |

FOREIGN PATENTS

| | | |
|---|---|---|
| 372,638 | Germany | Mar. 31, 1923 |